June 24, 1958  C. A. CHAYNE ET AL  2,840,368
TORSION SPRING REAR SUSPENSION
Filed Dec. 27, 1954  2 Sheets-Sheet 1

INVENTORS
Charles A. Chayne &
Maurice A. Thorne
BY
Paul Fitzpatrick
ATTORNEY

June 24, 1958  C. A. CHAYNE ET AL  2,840,368
TORSION SPRING REAR SUSPENSION
Filed Dec. 27, 1954  2 Sheets-Sheet 2

INVENTORS
Charles A. Chayne &
Maurice A. Thorne
BY
Paul Fitzpatrick
ATTORNEY

United States Patent Office 2,840,368
Patented June 24, 1958

2,840,368

TORSION SPRING REAR SUSPENSION

Charles A. Chayne, Bloomfield Township, and Maurice A. Thorne, Detroit, Mich., assignors to General Motors Corporation, Detroit, Mich., a corporation of Delaware Application December 27, 1954, Serial No. 477,615

9 Claims. (Cl. 267—57)

This invention relates to vehicle suspension and, in particular, although not exclusively, to longitudinal lever suspension for the rear wheels of the vehicle.

An object of the invention is to provide a lever type independent wheel suspension having a torsion spring disposed on the axis of rotation of the lever.

Another object is to provide a longitudinal lever suspension for the rear wheels of a vehicle wherein the spring means are disposed in concentric relation with the lever supporting structure.

Another object is to provide a suspension of the stated character wherein a generally transversely extending tubular supporting structure is secured to the vehicle frame and adapted to rotatably support a cooperating sleeve-like member having a generally longitudinally extending wheel supporting arm attached thereto, portions of the supporting structure and sleeve-like member being adapted for threaded engagement to maintain axial displacement therebetween at a low level throughout the maximum range of vertical movement of the wheel.

Yet another object is to provide a suspension structure of the type described wherein a torsion spring is disposed interiorly of the cooperating tubular members, one end of the spring being connected to one member and the other end being connected to the other member whereby to yieldably resist relative rotation therebetween.

Still a further object is to provide a structure of the stated character wherein adjustment, removal, and replacement of the torsion spring member may be readily accomplished.

A still further object is to provide a structure of the type referred to wherein the axis of rotation of the wheel support arm may easily be modified.

These and other objects and advantages of the invention will become more fully apparent as reference is had to the accompanying specification and drawings, wherein:

Fig. 1a is an enlarged fragmentary sectional view showing the sealing means disposed between relatively movable parts of the suspension.

Figure 1:
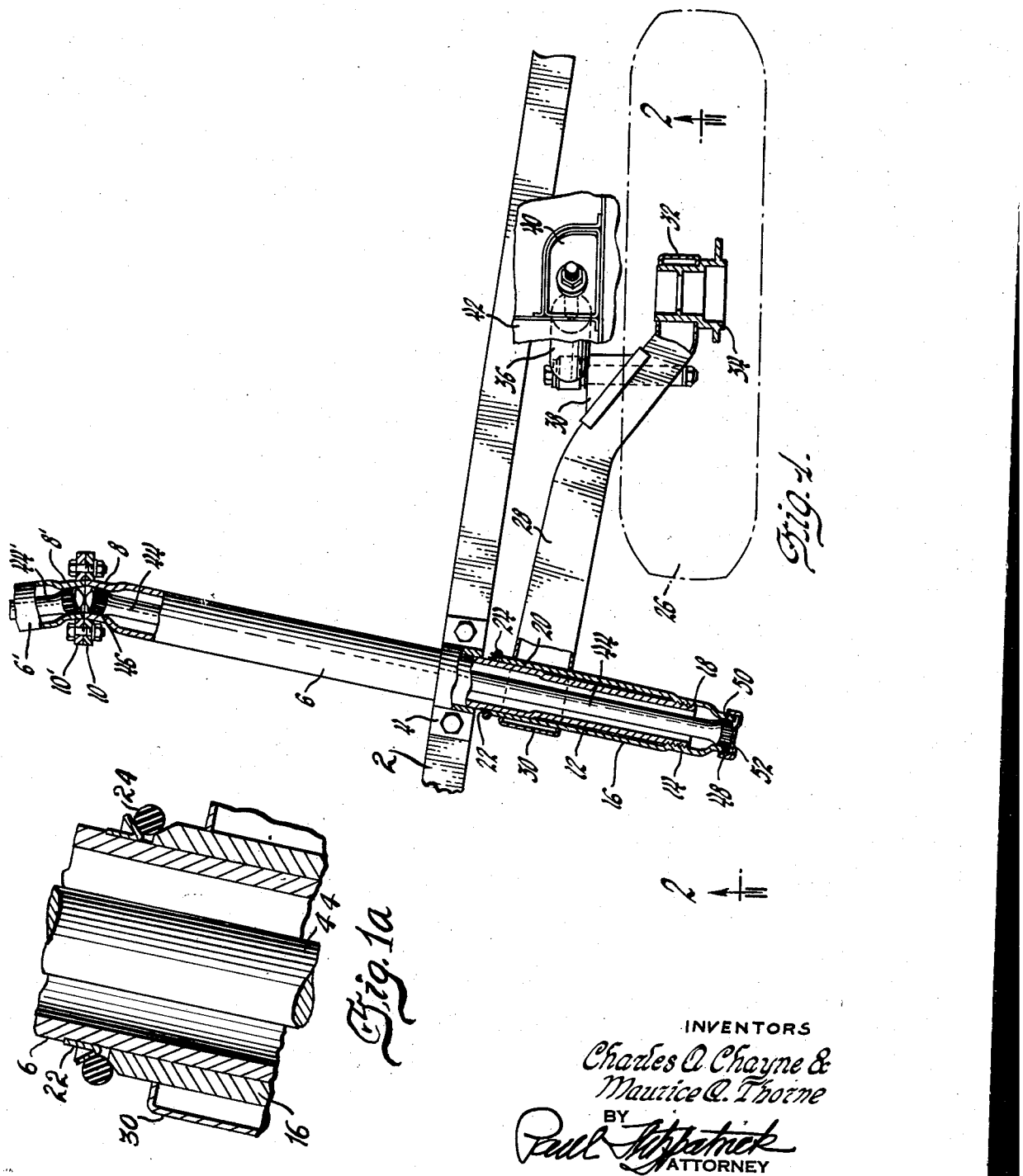
Fig. 1 is a plan view, partly in section, of the rear portion of a vehicle chassis showing the form and arrangement of the suspension structure.
Figure 2:
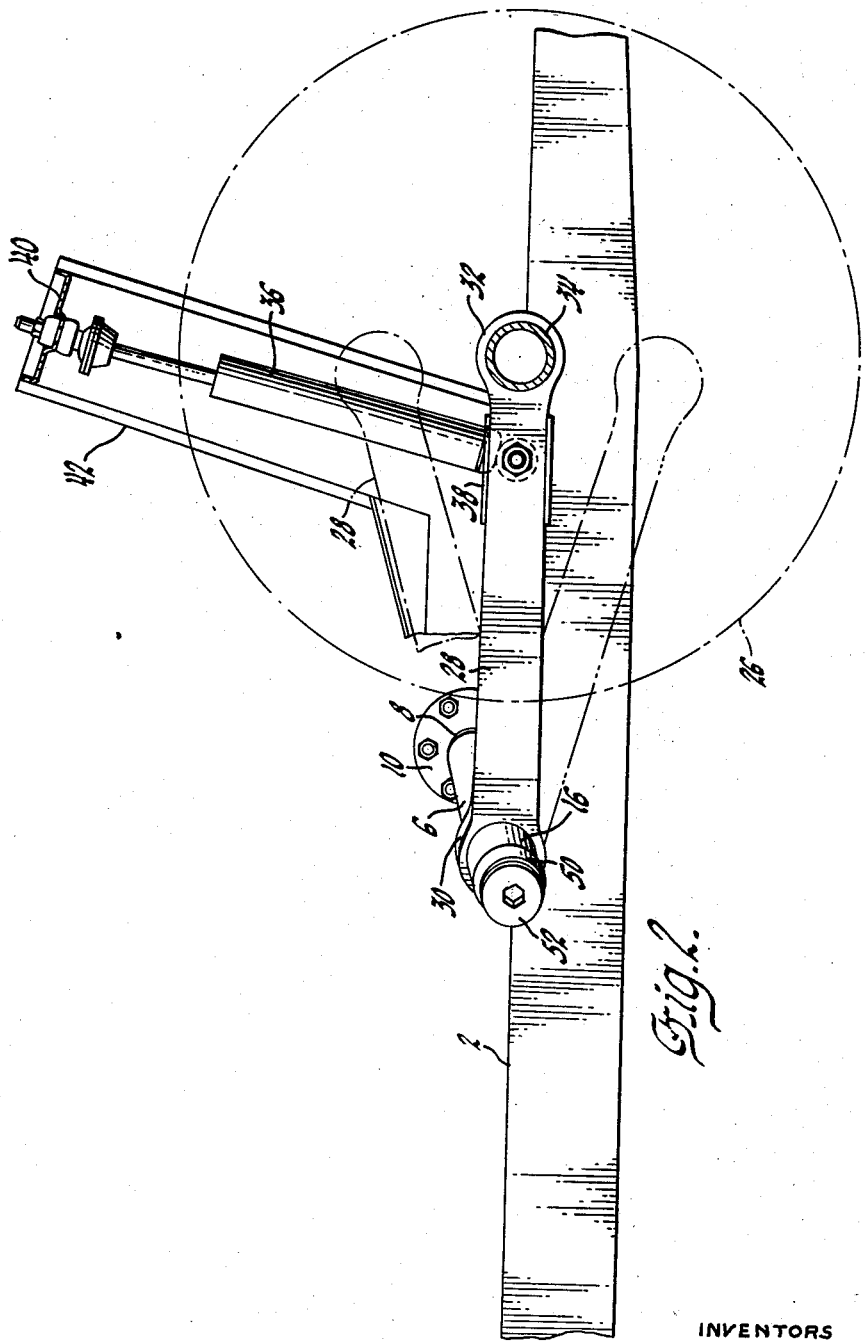
Fig. 2 is a side elevational view, partly in section, of the structure shown in Fig. 1.

Referring now to the drawings, there is illustrated a vehicle rear wheel suspension. While only the left side of the vehicle is shown, it will be understood that the contemplated suspension is symmetrical in the plan view and, accordingly, the description given with reference to the left rear wheel is equally applicable to that for the right rear wheel. The reference numeral 2 designates the left side member of the vehicle frame. Secured on the upper surface of member 2 by means of a clamp structure 4 is a generally transversely aligned tubular member 6 which extends from the longitudinal mid-line of the vehicle to a point outboard of member 2. At its inner end, tubular member 6 is reduced in diameter at 8 and has rigidly attached thereto a flange structure 10 which is adapted for bolt-on engagement with a similar flange structure 10'. 10' in turn is secured to the reduced end portion 8' of tubular member 6'. It will, therefore, be seen that in assembled position tubular members 6 and 6' form a single rigid tubular member, the outer ends of which are secured to the opposite sides of the vehicle frame. It will also be seen that by varying the angle of flanges 10 and 10' with respect to the longitudinal axis of tubular member 6 and 6', angularity of each tubular member may easily be altered to achieve any desired wheel camber characteristics.

As seen best in Fig. 1, the outer end portion 12 of tubular member 6 is slightly reduced in diameter and extends a considerable distance laterally outwardly from side frame member 2. At its terminal extremity, portion 12 is provided with external threads 14. Disposed in surrounding relation with portion 12 is a second relatively short tubular member 16 which is so dimensioned as to utilize the outside diameter of portion 12 as a pivot support or bearing surface. Near its outer extremity, member 16 in turn is provided with an internal threaded portion 18 which is adapted for threaded cooperation with external threads 14 of portion 12. To assemble member 16 on supporting portion 12, the former is slidably disposed over the latter and rotated a sufficient number of turns to provide substantial threaded engagement between threaded portions 14 and 18. Thereafter, member 16 is capable of limited rotation in either direction while axial movement thereof is limited to extremely slight uniform displacement attributable to the threaded connection.

Rigidly secured on tubular member 6 adjacent the inner extremity 20 of member 16 is an annular ring 22. A circular resilient seal 24 disposed in compression between ring 22 and the inner extremity 20 of member 16 prevents the entrance of foreign matter between the bearing surfaces as well as the escape of lubricant therefrom.

In order to suspend the wheel 26 for movement in a vertical path defined by the axis of rotation of member 16, there is provided a longitudinally rearwardly extending arm 28, the forward end 30 of which is secured adjacent the inner extremity of member 16. Near its rearward end, arm 28 is angled outwardly and formed with a terminal end portion 32 which is aligned in parallel relation with the longitudinal center line of the vehicle. End portion 32 engages a transversely extending wheel supporting hub structure 34 which in turn rotatably supports the wheel 26 in a known manner. A conventional telescopic shock absorber 36 is operatively connected at one end to a bracket 38 on the intermediate portion of arm 28 and at its opposite end to a mounting plate 40. Plate 40 in turn is disposed in the upper extremity of the vertically extending hanger 42 formed on side frame 2.

As seen particularly in Fig. 1, frame 2 is resiliently suspended with respect to wheel 26 by means of a single torsion spring 44. Spring 44 is disposed interiorly of members 6 and 16 in concentric relation therewith. The opposite ends of spring 44 are upset and splined or serrated at 46 and 48 to provide gripping engagement with the internally splined or serrated inside diameter of reduced portion 8 of tube 6 and the splined or serrated inside diameter of reduced portion 50 formed at the outer extremity of member 16. It will thus be seen that spring 44 is anchored at the inner extremity of tube 6 while the outer end is positively secured to and rotates with member 16 to accommodate vertical deflection of wheel 26. Since spring 44 must be installed after member 16 has been assembled over supporting portion 12 of tube 6, the diameter of serrated portion 46 is preferably smaller than the diameter of serrated portion 48, thus permitting serrated portion 46 to pass through the internally splined reduced portion 50. It will, of course, be understood that internally splined portions 8 and 50 are of diameters corresponding with the respective ends of spring 44. In order to permit fine increments of angular adjustment of spring 44 relative to members 6 and 16, it is preferable that the number of splines at one end of the spring be greater than the number of splines at the other end and thus permit utilization of the Vernier principle. By way of example, serrated portion 46 may be formed with 20 splines while serrated portion 48 is formed with 21 splines.

In order to maintain spring 44 against axial displacement after disposition in assembled position, there is provided an end cap 52 which threadably engages the terminal end portion 50 of tubular member 16. Since the inner ends of springs 44 and 44' are arranged in abutting relation, it will be apparent that the respective serrations of spring 44 and reduced portions 8 and 50 will be maintained in alignment. However, in the event that adjustment or replacement is required, removal of cap 52 permits the spring 44 to be withdrawn endwise without further disassembly of the suspension structure.

From the foregoing, it will be seen that a novel and extremely simple rear vehicle wheel suspension has been devised. The structure not only requires a minimum of simply constructed, low cost parts, but in addition permits of simple adjustment or replacement of the torsion spring element.

While but one embodiment of the invention has been shown and described, it will be apparent that other changes and modifications may be made therein. It is, therefore, to be understood that it is not intended to limit the invention to the embodiment shown but only by the scope of the claims which follow.

We claim:

1. In a vehicle, a frame, a tubular member mounted on said frame and extending laterally outwardly therefrom, means forming internal splines at the inner end of said member, a second tubular member surrounding said first tubular member, means forming internal splines at the outer end of said second tubular member, a lever connected to said second tubular member, a road wheel rotatably mounted on said lever, and a torsion spring disposed interiorly of said first and second tubular members, said spring having its opposite ends splined externally for engagement with the internal splines of said first and second tubular members, and cover means engageable with the outer end of said second tubular member to maintain said spring against axial displacement.

2. In a vehicle, a frame, a tubular member mounted on said frame and extending laterally outwardly therefrom, means forming internal splines at the inner end of said member, a second tubular member surrounding said first tubular member, means forming internal splines at the outer end of said second tubular member, a lever connected to said second tubular member, a road wheel rotatably mounted on said lever, and the torsion spring disposed interiorly of said first and second tubular members, said spring having its opposite ends splined externally for engagement with the internal splines of said first and second tubular members, said last mentioned splines being formed to permit endwise installation and removal of said spring, and cover means engageable with the outer end of said second tubular member to maintain said spring against axial displacement.

3. In a vehicle, a frame, a tubular member mounted on said frame, a second tubular member rotatably surrounding the outer end of said first tubular member, interengaging means on said first and second tubular members for preventing endwise separation of said members, a lever connected to said second tubular member, a road wheel rotatably mounted on said lever, and torsion spring disposed interiorly of said first and second tubular members, said spring having its opposite ends connected respectively at the inner and outer ends of said first and second tubular members respectively to resiliently support said frame with respect to said wheel.

4. In a vehicle, a frame, a pair of tubular members disposed transversely on said frame in endwise abutting relation, a second pair of tubular members rotatably surrounding the outer ends of said first mentioned tubular members, a longitudinally extending lever connected to each of said second tubular members, a road wheel rotatably mounted on each of said levers, and a pair of torsion springs disposed interiorly of each of said endwise abutting tubular members, said springs having their opposite ends connected respectively at the inner and outer ends of said first and second tubular members respectively, and means threadably engaging the outer ends of said second pair of tubular members to maintain said springs against axial shifting.

5. In a vehicle, a frame, a tubular member mounted on said frame and extending laterally outwardly therefrom, means forming internal splines at the inner end of said member, a second tubular member surrounding said first tubular member, means forming internal splines at the outer end of said second tubular member, a lever connected to said second tubular member, a road wheel rotatably mounted on said lever, and a torsion spring disposed interiorly of said first and second tubular members, said spring having its opposite ends splined externally for engagement with the internal splines of said first and second tubular members, the inner splined end of said spring being smaller in diameter than the outer splined end to permit endwise insertion thereof into assembled position, and cover means engageable with the outer end of said second tubular member to maintain said spring against axial displacement.

6. The structure defined in claim 3 wherein said interengaging means comprises cooperating threaded portions.

7. In a vehicle, a frame, a pair of tubular members disposed transversely on said frame, each of said tubular members having flange portions disposed at angles, means connecting said flange together to maintain said tubes in endwise abutting relation, a second pair of tubular members rotatably surrounding the outer ends of said first mentioned tubular members, a longitudinally extending lever connected to each of said second tubular members, a road wheel rotatably mounted on each of said levers, and a pair of torsion springs disposed interiorly of each of said endwise abutting tubular members, said springs having their opposite ends connected respectively at the inner and outer ends of said first and second tubular members respectively, and means threadably engaging the outer ends of said second pair of tubular members to maintain said springs against axial shifting.

8. In a vehicle, a frame, a pair of tubular members disposed transversely on said frame, each of said tubular members having flange portions disposed at oblique angles, means connecting said flange together to maintain said tubes in endwise abutting relation, a second pair of tubular members rotatably surrounding the outer ends of said first mentioned tubular members, a longitudinally extending lever connected to each of said second tubular members, a road wheel rotatably mounted on each of said levers, and a pair of torsion springs disposed interiorly of each of said endwise abutting tubular members, said springs having their opposite ends connected respectively at the inner and outer ends of said first and second tubular members respectively, and means threadably engaging the outer ends of said second pair of tubular members to maintain said springs against axial shifting.

9. In a vehicle, a frame, a pair of tubular members disposed generally transversely of said vehicle, means connecting the midportion of said tubular members to said frame, each of said tubular members having an oblique flange formed at the inner end thereof adapted for interconnection to maintain said tubes in endwise abutting angular relation, a second pair of tubular members rotatably surrounding the outer ends of said first mentioned tubular members, a longitudinally extending lever connected to each of said second tubular members, a road wheel rotatably mounted on each of said levers, and a pair of torsion springs disposed interiorly of each of said endwise abutting tubular members, said springs having their opposite ends connected respectively at the inner and outer ends of said first and second tubular members respectively, and means threadably engaging the outer ends of said second pair of tubular members to maintain said springs against axial shifting.

References Cited in the file of this patent

UNITED STATES PATENTS

| | | |
|---|---|---|
| 2,194,964 | Willson | Mar. 26, 1940 |
| 2,297,465 | Froehlich | Sept. 29, 1942 |
| 2,342,110 | Barber | Feb. 22, 1944 |
| 2,662,236 | Kester | Dec. 15, 1953 |

FOREIGN PATENTS

| | | |
|---|---|---|
| 890,324 | France | Feb. 4, 1944 |
| 410,657 | Great Britain | May 24, 1934 |